March 15, 1932.  R. H. JACKSON  1,849,190
APPARATUS FOR CEMENTING WELLS
Filed April 18, 1930   2 Sheets-Sheet 1
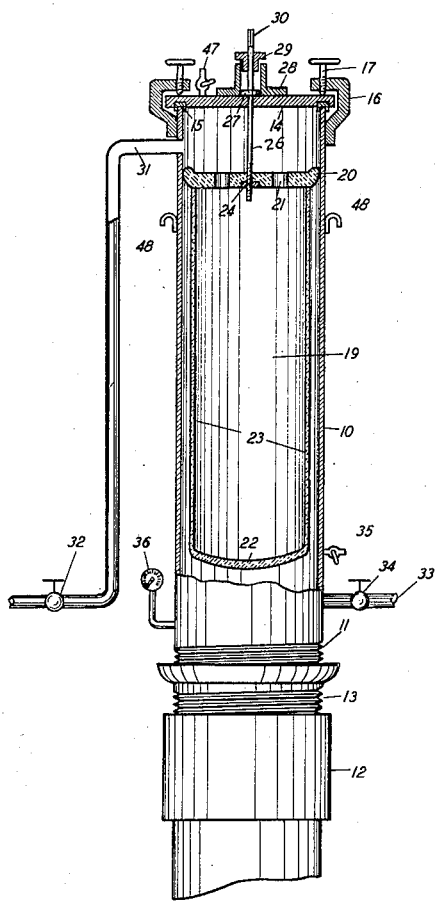
FIG. 1
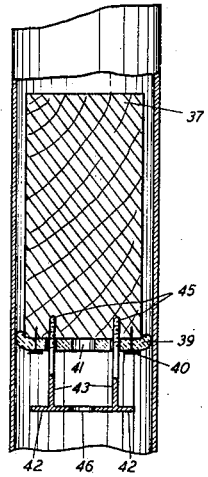
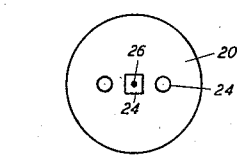
FIG. 4
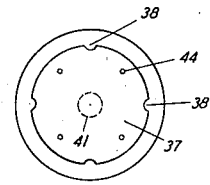
FIG. 3
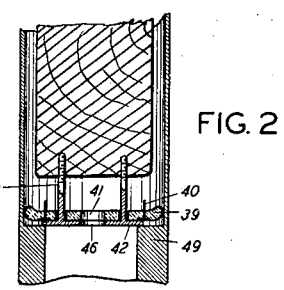
FIG. 5
FIG. 2
ROBERT H. JACKSON
INVENTOR
ATTORNEY March 15, 1932. R. H. JACKSON 1,849,190
APPARATUS FOR CEMENTING WELLS
Filed April 18, 1930  2 Sheets-Sheet 2

ROBERT H. JACKSON
INVENTOR
ATTORNEY

Patented Mar. 15, 1932

1,849,190

UNITED STATES PATENT OFFICE

ROBERT H. JACKSON, OF WHITTIER, CALIFORNIA

APPARATUS FOR CEMENTING WELLS

Application filed April 18, 1930. Serial No. 445,356.

My invention pertains to the art of cementing oil wells, that is, to the introduction of cement between the casing and the formation surrounding it for the purpose of excluding water from deeper lying formations.

In cementing wells and in particular such as are drilled by the well known rotary method, the hole and the casing within it are substantially filled with water or with the mud fluid used as a circulating medium. In order to place the cement back of the casing, that is, between the casing and the wall of the hole, it is pumped in on top of the fluid standing in the casing, and this pumping continued until a sufficient amount has been introduced. The supply of cement is then shut off and water or mud fluid pumped in on top until the cement is forced out of the casing, and is thus forced up into the interspace between the casing and the wall.

It is well known that it is important to prevent the cement from mixing with the mud fluid on top of which it is placed; to prevent the cement from mixing with the fluid with which it is followed to displace it from the casing; to stop introducing the displacement fluid after the cement is all in, at the narrowly limited point at which practically all of the cement is driven out of the casing but at which no displacement fluid is discharged from the casing to mix with the cement outside, and that it is necessary to hold the cement in a fixed position in the interspace until it has had time to set.

Many devices have been proposed for these purposes and some are now in use, but I believe that the device here proposed has numerous advantages over those heretofore made known, in that it completely separates the downwardly traveling column of cement from the fluid beneath it while allowing any desired quantity of cement to be introduced, that it completely separates the upper end of the column of cement from the displacement fluid, and that it maintains a complete separation of the cement remaining in the lower end of the casing from the fluid above it during the setting period and thus enables the cement outside the casing to be held in an absolutely fixed position until the set is complete.

The objects and advantages of my invention may be best understood from an inspection of the accompanying drawings (of a specific embodiment of the principles of my invention), and the following description thereof, in which:

Fig. 1 represents a complete embodiment of my invention the working parts being shown in cross section and the lower sealing block B being shown in the position which it assumes while it is closed against the passage of cement as will be hereinafter described.

Fig. 2 is a cross section of the lower block B when it has come to rest on the bottom of the hole.

Fig. 3 represents in plan the removable head of the fitting shown in Fig. 1.

Fig. 4 is a plan of the upper end of the expansible bag shown at Fig. 1.

Fig. 5 is a plan view of the sealing block shown in Fig. 1 and also in Fig. 2.

Figure 7:
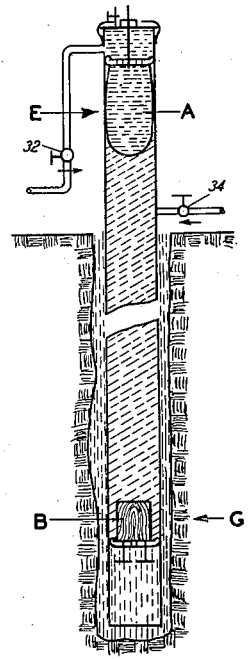

Fig. 7 indicates the position of the parts during the second stage of the cementing operation.

Figure 8:
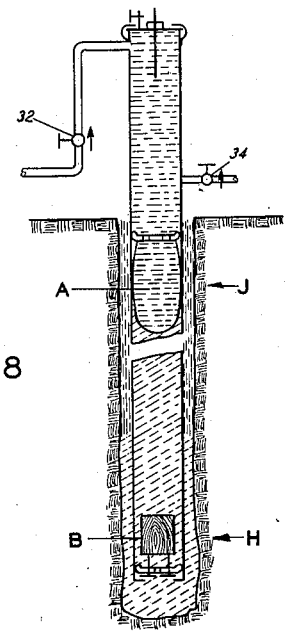
Figure 9:
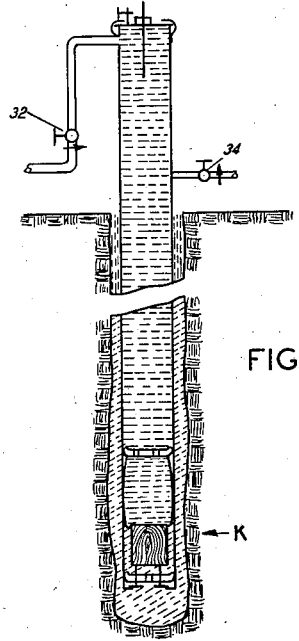

Fig. 8 indicates the position of the parts in the third stage of the cementing operation, and Fig. 9 represents the final position of the parts with the cement in place behind the casing.

Referring to Fig. 1, 10 is a cylindrical shell of the same internal diameter as the casing to be cemented, having at its lower end threads 11 adapted to be screwed into a casing collar 12. It is desirable to interpose a subnipple 13 to save the threads of the shell from damage in moving from well to well, this subnipple being left in place on the shell until its threads become worn or mutilated.

At its upper end shell 10 is fitted with a readily detachable closure, such for instance as the plate 14 having on its lower face a ring of hydraulic packing 15 which makes a leak tight joint with the squared upper edge of the shell. To the sides of the shell are attached a plurality of inwardly turned arms 16 having temper screws 17 by which the packing may be compressed and a nonleaking joint formed. The plate is placed beneath the inward ends of the arms by passing these through slots 18 correspondingly spaced around the periphery of the plate and then revolving the plate until the slots are out of register with the arms. The closure shown is merely suggestive, the only requirement being for a readily removable cover plate, of which many forms are well known.

The cover plate is also provided with an air cock 47 and the shell with two hooks 48 by means of which it can be suspended from the cat line.

From the cover plate is suspended a soft rubber bag 19 having generally the form shown in Fig. 1. The top of the bag is substantially flat, as at 20, but has its edges upturned for more ready insertion and is of such size as to fit snugly within the shell and the casing to be cemented. This top piece is provided with one or more holes 21 through which water or circulating fluid may enter the bag, which has no other outlet. The bottom piece 22 may be slightly downcurved, as shown, and the side walls 23 are in the form of a tube having clearance within the shell.

The bag 19 may be formed only in part of rubber. Thus the top and bottom pieces may be reinforced with cords or fabric or built up of laminations of rubber and fabric, as in a socalled rubber belt. The side walls may also be reinforced, preferably with cords as in a tire casing, and these cords must be crossed at an angle with the axis in order that the walls may fully expand under internal pressure while reducing the length of the bag.

As an example of relative dimensions; for a 6" casing the top piece may be say ¼" greater in diameter than the actual inside diameter of the casing to be cemented, the bottom and the tube say ½" less in diameter than the casing, the length of the tube say 3 times its outside diameter, the tube walls say ½" thick, the top pieces say 1" thick and the bottom piece say 2" thick at its center and 1½" thick where it joins the side walls. I do not restrict myself to these nor to any set dimensions, which may be widely varied.

Into the bottom of the top piece 20 is cemented a screw nut 24 engaging threads on a supporting rod 26. This rod is passed through the top plate 14 from above and is prevented from pulling through by a small light flange 27. Around this flange and the rod is formed a stuffing box 28 having a gland 29 to prevent leakage of fluid around the rod. The upper end of the rod may be squared for a wrench or spanner as at 30.

By means of this rod the bag 19 may be supported within the shell until it is required for use, as hereinafter described, at which time it is released by unscrewing the rod from the nut.

Just above the lower end of the rod a pipe connection 31 having a control valve 32 communicates with the upper end of the shell and with the discharge end of the usual slush pump, not shown. Below the lower end of the bag a pipe 33 controlled by a valve 34 affords communication between the shell and a source of supply of liquid cement, not shown. An air cock 35 is placed on the side of the shell near its lower end and a pressure gauge 36 may be attached to the shell in a similar manner.

The sealing block B, shown at the lower end of Fig. 1 and also in Fig. 2, has as its upper portion a cylinder of soft wood 37, of say ¼" to ½" less diameter than the casing, and say two diameters in length. This wood block is turned smooth and flat on its lower end and should have its lower corner rounded to prevent cutting into the rubber disc below. The block may have longitudinal grooves as shown at 38 cut in its outer face, to allow the free passage of cement past the block.

At the lower end of this block is placed a soft rubber disc 39, having upturned edges and a diameter slightly greater than that of the casing. As this disc will fit rather tightly in the casing it is desirable to drive through it and into the end grain of the block a plurality of slim nails 40, of sufficient size to keep the block from floating away from the disc but not to resist the detachment of the block from the disc when the assembly reaches the point of disengagement later described. The disc has a hole 41 formed at substantially its center, to permit passage of cement around the block and through the disc when the two are out of contact as shown in Fig. 2.

Below the disc and spaced say 2" to 4" therefrom is a plate or ring 42 to which are firmly attached three or more rigid riser rods 43, these rods passing freely through corresponding holes 44 in the disc and being firmly driven into the lower end of the block as at 45. This plate should be accurately squared with the axis of the block and is provided with a central opening 46 aligned with opening 41 through the disc.

If the plate 42 and rods 43 are of steel, the plate may be say ¼" thick and the rod say ⅜" in diameter and about 7" long. The entire assembly may desirably be made of cast iron, either integral or with the rods screwed into the plate. Or if even this amount of metal is considered too much to drill out after cementing, the plate may be made of a hard wood, such as maple, say 1½" thick, and the risers of a similar wood and about 1" in diameter. These latter dimensions are, of course, too great for cementing a very small casing, and for such unusual cases cast iron is to be preferred.

Referring to Figs. 6, 7, 8 and 9, a well may be cemented with the above apparatus by the following procedure.

The well is first circulated and prepared for cementing in any usual or preferred manner, through the usual circulating connections, the shell A not yet being in place. The circulating connections are then removed, leaving the casing head open, and the sealing block B inserted in the casing on top of the fluid. The fluid level in the casing may remain stationary, in which case the block will occupy position C in Fig. 6, or the level may slowly lower by seepage into the formation, in which case the block, if inserted immediately after removing the circulating connections, will be carried down by atmospheric pressure as the fluid level falls and will pass down to some lower position as at D, but in either case will be substantially in contact with the upper end of the fluid column within the casing.

Figure 6:
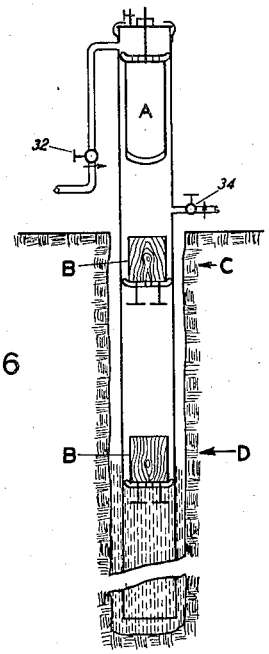
Fig. 6 is a diagrammatic representation of the position of the parts in the first stage of the cementing operation.

The shell assembly A is now screwed into the casing head with the bag 19 in position, and the well is ready for cementing with all the working parts in the position shown in Fig. 6. The position of the valves 32 and 34 in each of these four figures is indicated by the directional arrow placed opposite each valve, a cross arrow indicating a closed and a longitudinal arrow an open valve.

The next step is diagrammatically illustrated in Fig. 7. This step consists in pumping the desired quantity of cement into the casing. It is first desirable to open air cock 47 and to very slightly open valve 32, thus admitting just enough fluid to inflate the bag and fill the space above it and above the valve. When fluid appears at the air cock this cock is closed and valve 32 is tightly closed, remaining so during the introduction of cement. It is highly essential that valve 32 be perfectly tight, as the back leakage of the few gallons of fluid contained in it would allow it to collapse under the pressure of the cement and be driven into the upper end of the shell and thus damaged or destroyed. The bag and shell are now as indicated at E in Fig. 7.

Valve 34 is now opened and the introduction of cement started. There may and usually will be an air column in the upper end of the casing, above block B, and it is therefore desirable to open air cock 35 and allow it to remain open until cement appears. This will ensure the complete evacuation of air from the casing and avoid blow holes in the cement. At this stage the cement column has risen to the lower end of the inflated bag as indicated at F in Fig. 7 and the sealing block is traveling downwardly as indicated at G, the block then being in the closed position shown at the lower end of Fig. 1, with the rubber disc 39 in contact with the block 37. In this position the hole through disc 39 is sealed by the block and the cement column is thus sharply parted from the column of fluid which is being displaced.

The casing may or may not be provided with a baffle plate, and if it is not the plug B will be carried down in the closed position into the shoe, indicated at 49 in Fig. 2. When either the baffle or the shoe is reached the edges of the plate encounter it and the plate comes to an abrupt stop, thus holding the risers 43 and the block 37 stationary. The pressure of the cement column continues to act on the exposed edges of the disc 39 which is thus detached from the block and carried downward until it comes to rest on the plate, the cement then finding its way around the block and through the longitudinal grooves 38 and thence through holes 41 through the disc and 46 through the plate. The block in this position is shown at H in Fig. 8, with the cement sidetracking the block and rising around the casing.

When the required amount of cement has been introduced valve 34 is closed and valve 32 opened. Circulating fluid or water from the slush pump then enters above the bag A and forces it down the casing, effectively parting the following fluid from the cement column immediately below. This is indicated at J in Fig. 8. Pressure inside and outside the bag being equal there is no bursting pressure on the bag, nor any tendency for it to expand sufficiently to be abraded by the inner wall of the casing.

When the cement is all out of the casing bag A will come to rest on block B, as indicated at K in Fig. 9, a point which will be indicated by a sharp rise in pressure on the gauge 36. The bag then expands to form a firm and tight packing against the casing wall and will absolutely prevent the infiltration of water into the cement from the column of fluid above. At the same time there is no possibility of the bag being forced past the block, as its rubber side walls are of greater thickness than the clearance between the block and the casing.

Valve 32 is now tightly closed and the job allowed to stand until the cement has set. The fluid column may be maintained absolutely stationary by maintaining a pressure on gauge 36 equal to or greater than that shown at the end of the fluid introduction stage, and a higher pressure will do no harm as there is no possibility whatever of fluid either leaking past or breaking through the seal formed by the block and the bag as shown at K.

When the cement has set the plug remaining in the end of the casing is drilled out in the usual manner, the only hard material to be removed from the hole being a thin plate

(42) and three or more studs (43), each say ⅜" by 7" long. These parts may be of cast iron or of wood, as above described, if in the opinion of the operators this is too much steel to leave in the hole.

I believe that my improved apparatus for cementing oil wells has the following advantages over apparatus heretofore proposed or used: (a) the entire apparatus may be assembled in advance, the only change required during the operation being the substitution of the bag shell for the circulating connections prior to the introduction of cement; (b) by placing a stiffly flexible rubber disc on top of the fluid and following it with cement the wall of the casing is wiped clean or fluid in advance of the cement column; (c) by providing an air vent above the point of introduction of the cement air may be completely vented from the casing instead of being carried down with the cement; (d) the disc and block combination sharply parts the cement column from the fluid column below, so long as any fluid remains in the casing, and then opens to allow the unimpeded passage of any further quantity of cement; (e) the rubber bag is in position to be forced instantly into the casing when the cement is all in, preventing air from following the cement and being driven out of the casing with it; (f) the bag and disc form a perfectly tight seal between the upper end of the cement column and the fluid used to drive the cement out of the casing; (g) the bag striking the blocks forms a perfect seal between cement and following fluid, ensuring that the cement cannot leak back into the casing; (h) the entire apparatus, and particularly the parts which cannot be resued, is simple and cheap, and (i) the metal parts to be drilled out with the plug are of trifling weight and dimensions, and the use of metal may be entirely avoided if desired. In sum, by the use of my auparatus a cementing job may be completed at less cost and in less time than has heretofore been possible, and with a much greater assurance of obtaining a tight and satisfactory seal between the casing and the formation.

I claim as my invention:

1. Apparatus for cementing oil well casings containing circulating fluid, comprising: a sealing means adapted to be inserted into said casing above said circulating fluid and to sharply part said fluid from a cement fluid placed thereover, said sealing means having a valve normally closed and adapted to open when said sealing means encounters any material obstruction in said casing; means for introducing cement fluid above said sealing means; means for parting said cement fluid from a displacement fluid used to displace said cement from said casing, said parting means comprising a freely distensible bag, made of a material adapted to become wedged between the sealing means and the casing to make a substantially water tight packing, a flexible disc closing the upper end of said bag and an opening through said disc, and means for introducing said displacement fluid into said casing above said disc, whereby said bag is distended and said disc and bag are forced downward to displace said cement fluid from said casing while sharply parting said cement fluid from said displacement fluid.

2. Apparatus for cementing oil well casings containing circulating fluid, comprising: a sealing means adapted to be inserted into said casing above said circulating fluid and to sharply part said fluid from a cement fluid placed thereover, said sealing means having a valve normally closed and adapted to open when said sealing means encounters any material obstruction in said casing; means for introducing cement fluid above said sealing means; means for parting said cement fluid from a displacement fluid used to displace said cement from said casing, said parting means comprising a freely distensible rubber bag of such a wall thickness that it will become packed between the sealing means and the casing to constitute a substantially water tight packing, a flexible disc closing the upper end of said bag and an opening through said disc, and means for introducing said displacement fluid into said casing above said disc, whereby said bag is distended and said disc and bag are forced downward to displace said cement fluid from said casing while sharply parting said cement fluid from said displacement fluid, and means for introducing said bag into said casing without interrupting the flow of fluid into said casing.

3. In an apparatus of the class described, a sealing means comprising: a flexible disc adapted to fit snugly within said casing and having an opening therethrough for the passage of cement fluid; a rigid body normally contacting with the upper surface of said disc and thereby closing said opening, said body having a cross sectional area materially less than that of the interior of said casing, and means for separating said rigid body from said disc and uncovering said opening when any material obstruction in said casing is encountered by said sealing means.

4. In an apparatus of the class described, a sealing means comprising: a flexible disc adapted to fit snugly within said casing and having an opening therethrough for the passage of cement fluid; a rigid body normally contacting with the upper surface of said disc and thereby closing said opening, said body having a cross sectional area materially less than that of the interior of said casing, and means for separating said rigid body from said disc and uncovering said opening, said means including a rigid rod adapted to stop said rigid body when the lower end of said rod encounters any material obstruction to the downward movement of said sealing means through said casing.

5. In an apparatus of the class described, a sealing means comprising: a flexible disc adapted to fit snugly within said casing and having an opening for the downward passage of cement fluid; a wooden block of materially less cross sectional area than that of the interior of said casing, said wooden block being detachably attached to said disc and having its lower end so shaped as to close said opening, and means for separating said block from said disc and thereby unclosing said opening when any material obstruction in said casing is encountered.

6. In an apparatus of the class described, a sealing means comprising: a flexible disc adapted to fit snugly within said casing and having an opening for the downward passage of cement fluid; a wooden block of materially less cross sectional area than the interior of said casing, said wooden block having its lower end so shaped as to close said opening; a substantially rigid rod projecting downwardly from the lower side of said block, and means attached to the lower end of said rod to stop the downward motion of said block and to thereby separate said block from said disc and to uncover said opening when said means encounters any material obstruction to its downward movement through said casing.

7. In an apparatus of the class described, parting means comprising: a freely distensible and substantially liquid tight bag in the form of a hollow cylinder of less diameter than the interior of said casing and having a flexible bottom and a perforate top in the form of a flexible disc fitting snugly within said casing.

8. In an apparatus of the class described, parting means comprising: a freely distensible and substantially liquid tight bag in the form of a hollow cylinder of less diameter than the interior of said casing and having a rubber bottom and a perforate top in the form of a rubber disc fitting snugly within said casing.

In witness that I claim the foregoing I have hereunto subscribed my name this 14th day of April, 1930.

ROBERT H. JACKSON.